Dec. 17, 1963  L. C. HARDISON  3,114,699
METHOD OF HEAT CONTROL IN A FLUIDIZED CATALYST SYSTEM
Filed Nov. 29, 1960
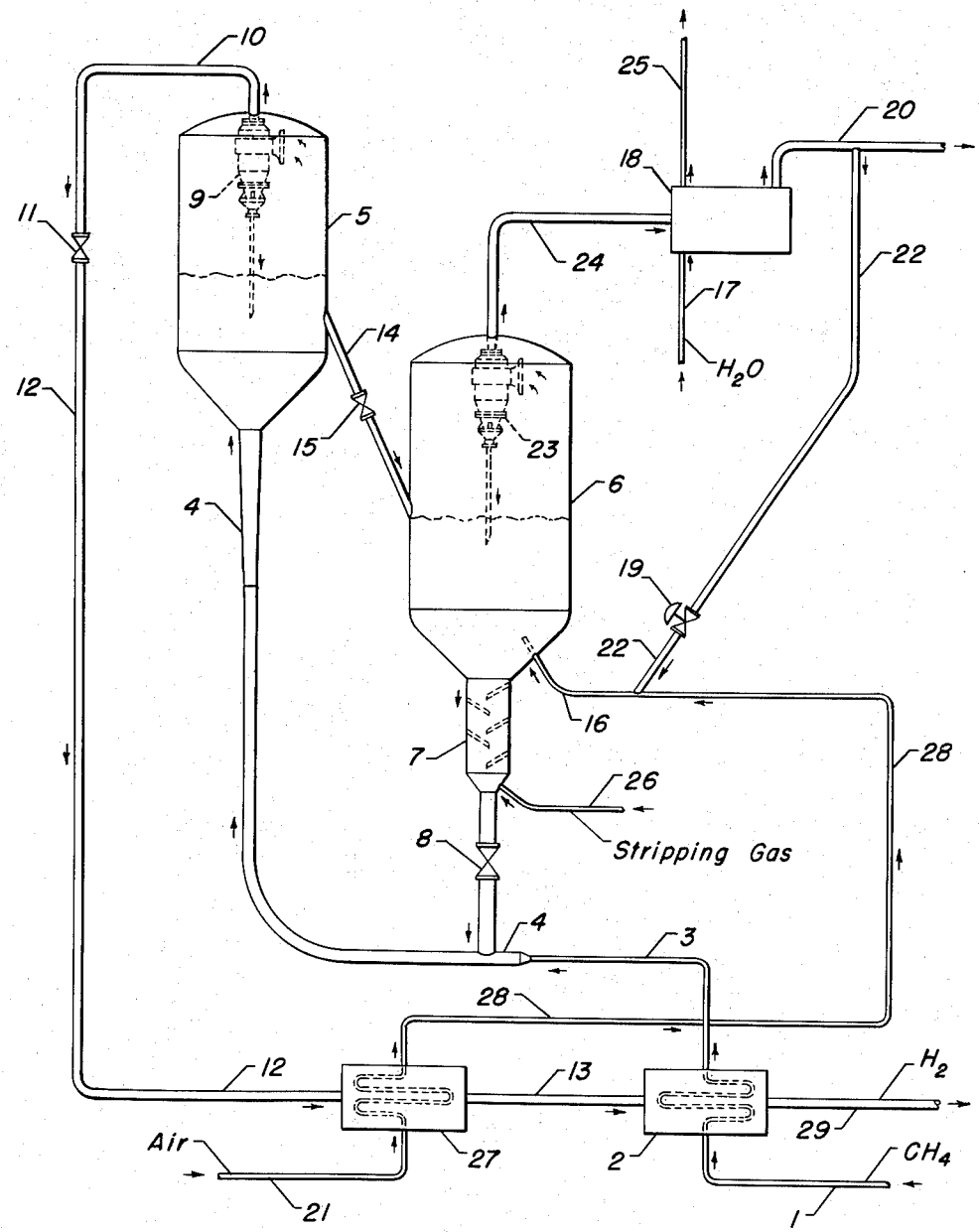
INVENTOR:
Leslie C. Hardison
BY:
Chester J. Giuliani
James R. Hoatson Jr.
ATTORNEYS

United States Patent Office 3,114,699
Patented Dec. 17, 1963

3,114,699
METHOD OF HEAT CONTROL IN A FLUIDIZED CATALYST SYSTEM
Leslie C. Hardison, Arlington Heights, Ill., assignor to Universal Oil Products Company, Des Plaines, Ill., a corporation of Delaware
Filed Nov. 29, 1960, Ser. No. 72,495
5 Claims. (Cl. 208—159)

This invention relates to a novel method of temperature control in a fluidized catalyst system. In particular, this invention relates to a novel method of temperature control of a fluidized catalyst system for the production of hydrogen, said system comprising a reaction zone and a heating and regeneration zone having a moving bed of catalyst continuously circulating therethrough.

The general principles relating to the operation of a fluidized catalyst conversion type of unit are now well known in the chemical and petroleum arts and do not warrant a detailed description herein. In general, a conversion unit of this type comprises a separate reaction zone and a separate heating and regeneration zone with a moving bed of catalyst circulating therethrough. A hydrocarbon charge is catalytically cracked in the reaction zone at an elevated temperature and in the presence of the fluidized catalyst particles. In the cracking process a carbon residue is deposited on the catalyst particles which are thereafter circulated to a heating and regeneration zone wherein the carbon residue is oxidized by air or other oxygen-containing gas. As a result the catalyst particles are regenerated by having the carbon burned therefrom while at the same time being heated to an elevated temperature. The hot regenerated catalyst particles are then circulated back to the reaction zone to catalyze the cracking reaction therein while furnishing the necessary heat for the cracking process.

In a fluidized catalyst system, as above described, it is highly desirable that the heat produced by the oxidation of the carbon residue in the heating and regeneration zone closely approximate the endothermic heat of reaction required for the cracking process in the reaction zone plus the sensible heat which is carried from the system by the products of the reaction. This heat balance can be readily controlled if the oxidation of the carbon residue goes to equilibrium products which, at the high temperatures commonly employed in the heating and regeneration zone, result in a high $CO/CO_2$ ratio and a low B.t.u./lb. of carbon. While the oxidation of the carbon residue is, in a sense, self-controlling in that the ratio of $CO$ to $CO_2$ in the equilibrium products tends to increase with increasing regenerator temperatures, any mal-distribution of air in the heating and regeneration zone may very well result in the oxidation of the carbon residue going all the way to $CO_2$, releasing much more heat than the process requires. Since the $CO_2$ does not readily convert to $CO$ to re-establish the equilibrium $CO/CO_2$ ratio, runaway temperatures are likely to result. Decreasing the air supply to the heating and regeneration zone will simply oxidize less of the carbon residue causing an increase in the carbon content of the regenerated catalyst without re-establishing the desired $CO/CO_2$ ratio.

Various techniques are commonly employed to control the excessive temperatures resulting from the oxidation of the carbon residue in the heating and regeneration zone. For example, in some instances steam is injected into the regeneration zone when the temperatures therein exceed the desired upper limits, said steam serving to quench the excessive temperatures resulting from the oxidation reaction. As a result of the quenching process there is a considerable loss of heat, detracting of the overall economic aspects of the system.

It is an object of this invention to present a novel method for the continuous control of regenerator temperatures in a fluidized catalyst system. It is a further object to present a novel method for establishing a controlled heat balance between the heating and regeneration zone and the reaction zone of a fluidized catalyst system for the production of optimum yields of hydrogen and a regenerator flue gas characterized by a particularly high heat of combustion.

In one of its broader aspects this invention relates to the cracking of hydrocarbons in the presence of a moving bed of hot catalytic particles which are circulated through a reaction zone to a separate heating and regeneration zone and back to the reaction zone, and embodies an improved method for controlling the temperatures resulting from the oxidation of the carbon content of the carbonized catalytic particles in said heating and regeneration zone which comprises contacting the carbonized catalytic particles in said heating and regeneration zone with a gaseous mixture comprising steam and an oxygen containing gas and continuously controlling the steam-oxygen-containing gas ratio of the gaseous mixture so that it varies with direct relation to temperature deviations from a pre-selected heating and regeneration zone temperature. Further embodiments and objects of the present invention will become apparent in the following more detailed descriptive matter.

The method of this invention can be utilized with relation to fluidized catalytic cracking processes generally. However it finds particular utility in connection with fluidized catalytic processes for the production of hydrogen. The attached schematic drawing represents such a process and the further description of the method of the present invention is presented with reference thereto.

The hydrocarbon charge generally employed in the hydrogen producing system of the type herein specified comprises the normally gaseous hydrocarbons such as methane, ethane, ethylene, propane, propylene, butene, butylene, isobutene, etc., or various mixtures thereof, natural gas being frequently employed. The hydrocarbon, charged through line 1 to a heat exchanger 2, is at least partially pre-heated by heat exchange relationship with the high temperature product stream and thereafter charged to the bottom of the reaction zone 5 through line 3 and an enlarged riser line 4. Hot, regenerated, catalytic particles descending from the heating and regeneration zone 6 are contacted with a stripping gas, such as steam, introduced to the stripping zone 7 through line 26. The particles thereafter pass through a control valve 8 and are carried to the reaction zone 5 by the hydrocarbon charge through the enlarged riser line 4. In the reaction zone 5 the hot catalytic particles effect the cracking of the hydrocarbon charge to form a hydrogen product and deposit a carbon residue on the catalytic particles. Where, as in the present case, the intended product is hydrogen, it is desirable to regulate the heat supplied by the hot catalytic particles to the reaction zone so as to maintain a controlled temperature therein in the range of from about 1300° F. to about 1700° F.

The fluidized catalytic particles herein referred to are not limited to any particular type inasmuch as various types and sizes are generally utilized in the present type of system. Generally, the catalytic particles must be attrition resistant and capable of withstanding the high reaction and regenerator temperatures encountered in this type of process. Refractory materials such as silica-alumina or silica with magnesia or one or more oxides of zirconium, titanium, and the like, or alternatively, alumina with oxides of chromium, molybdenum, vanadium, etc., are utilized. Preferably, one or more metals or oxides of metals of group VIII are utilized in hydrogen formation. Thus, nickel, iron or cobalt compounds are advantageously used on a refractory base material such as silica-alumina. The particle size is such that the particles flow in a fluidized manner in intimate contact with the surrounding media through the reaction zone and the heating and regeneration zone. Generally, catalytic particles of less than about 2 millimeters in diameter are utilized. Microspherical particles of between 0.1 and 0.8 millimeter in diameter are effectively and efficiently utilized in fluidized systems. The hydrogen product is withdrawn from the upper portion of the reaction zone 5 through a particle separator 9, exiting from said zone via line 10 and a pressure control valve 11. The hydrogen is passed to a first heat exchanger 27 by way of line 12 and then to a second heat exchanger 2 via line 13 and discharged from the process through line 29 to suitable product treating equipment.

The carbonized catalytic particles exit from the reaction zone through a conduit 14 having a control valve 15, and are carried to the heating and regenerating zone 6. Within the heating and regeneration zone the catalytic particles are contacted with a gaseous mixture comprising air, or other oxygen-containing gas, and steam introduced to the heating and regeneration zone through line 16. According to the method herein disclosed, said gaseous mixture comprises sufficient air, or other oxygen-containing gas, and steam to effect the oxidation of the carbon residue therein at a rate substantially the same as the rate at which said carbon residue is formed in the reaction zone at equilibrium conditions for the gaseous products being discharged from the regenerator. A particular ratio of steam to air in said gaseous mixture is at any given time determined by the temperature then existing in the regeneration zone, or alternatively, by the temperature then existing in the reaction zone. For example, as the temperature exceeds the predetermined limits the ratio of steam to air increases, said ratio decreasing as the temperature subsides. To maintain a controlled temperature in the range of from about 1300° F. to about 1700° F. requires that the catalytic particles be heated to a temperature in the range of from about 1400° F. to about 1800° F. in the heating and regeneration zone. The method of this invention serves to maintain a controlled temperature within the desired range in the heating and regeneration zone so as to minimize undue temperature fluctuations in the reaction zone.

Referring again to the attached drawing, water may be introduced to the system through line 17 and converted to steam in a steam generator 18. The steam is preferably heated to a temperature substantially the same as the temperature of the air entering the heating and regenerating zone. At least a portion of the steam passes to line 16 by way of line 20 and line 22 which has incorporated therein a control valve 19. It is the function of the control valve 19 to regulate the steam-air ratio of the gaseous mixture with relation to the temperature existing in the heating and regeneration zone, or alternatively, to the temperature existing in the reaction zone. Air is introduced to the system by way of line 21 at a substantially constant rate, said rate depending on the rate the carbon residue is formed in the reaction zone as formerly described. The air is preheated by heat exchange methods in a heat exchanger 27 and passes through line 28 to be admixed with controlled amounts of steam from line 22. The resulting gaseous mixture enters the regeneration zone through line 16.

The gaseous mixture comprising steam and air passes upwardly through the heating and regeneration zone in contact with the downward flow of catalytic particles, the regenerated particles leaving the regeneration zone through a stripping zone 7. The hot regenerated particles then pass through a control valve 8 to the enlarged riser line 4 where they contact the hydrocarbon charge stream and are thus carried in admixture therewith through the riser line 4 to the reaction zone 5.

The flue gases resulting from the reaction of the steam-air mixture with the carbon residue pass upwardly through the heating and regeneration zone exiting therefrom to a particle separator 23 and line 24. The flue gases are thereafter utilized as fuel in the steam generator 18 to effect the production of steam from water introduced thereto through line 17. The spent flue gases exit from the steam generator through line 25.

The steam portion of the gaseous mixture introduced to the regeneration zone in the aforesaid manner, reacts endothermically with at least a portion of the carbon residue to form hydrogen and carbon monoxide. The practical result of this procedure is the withdrawal of excess heat from the regeneration zone while at the same time increasing the heating value of the flue gases produced therein which may be subsequently utilized as fuel for this process or in other processes.

The method herein employed is to be distinguished from usual quenching methods, in that in the present method heat is withdrawn from the regenerator as the result of the endothermic reaction of the steam with carbon. Since the steam is employed as a reactant it can be introduced to the regeneration zone at a temperature substantially the same as the temperature existing in the regeneration zone. By the quenching method, quantities of steam must be introduced to the regeneration zone at a temperature substantially lower than the temperatures existing therein in order to exert a cooling effect. It is well known that the thermal shock encountered in the quenching process has the undesirable effect of breaking up the catalyst particles.

A further advantage in the utilization of the present method is ot be found in relation to those operations wherein it is desirable to maintain a particular carbon level on the regenerated catalytic particles. Excessive carbon residues can be reduced by increasing the flow of oxygen or air to the heating and regeneration zone. However, this procedure necessarily results in a temperature increase which, in some cases, may exceed the desired limits. By the present method of heat control any excess heat is removed as a result of the endothermic reaction involving the steam and the carbon residue, which reaction also aids in reducing the carbon content of the catalytic particles while maintaining a desired high yield of CO from the regeneration zone.

The following example is presented to further illustrate the novelty and utility of the method of heat control of the present invention. It is not intended that the generally broad scope of this invention be unduly limited thereby.

EXAMPLE I

As an example of the method of this invention consider the production of hydrogen under the following conditions:

Feed composition _____ 80 volume percent $CH_4$,
20 volume, percent $C_3H_8$.
Reaction temperature _____ 1450° F.
Regeneration temperature ___ 1600° F.
Gas feed temperatures:
    Charges gas _____ 1000° F.
    Combustion air _____ 1000° F.

To avoid confusion as to size of the processing system, all quantities are based on the oxidation of one pound mol per hour of carbon. A material balance for this system is given in Table I with no water addition. A heat balance for this case is set forth in Table II which shows a heat surplus of 9,400 B.t.u./hr. This simply indicates that the process would not operate continuously at the conditions specified. If the reactor temperature control is maintained by control of catalyst circulation rate, then the regeneration temperature would run higher than 1600° F.

In order to operate at the conditions set forth above, it is necessary to add 1.8 lbs./hr. of water to the combustion air stream, and to reduce the air flow from 71.1 lbs./hr. to 65.2 lbs./hr. Tables III and IV give material balance and heat balance numbers with water injection and illustrate that the process can now be operated in heat balance.

To illustrate the operation of this method of temperature control, assume that in a process as outlined above the feed composition changed from 20% $C_3H_8$ to 25% $C_3H_8$. The process would then produce more heat than required to maintain the desired reaction and regeneration temperatures if the same air-water mixture was supplied to the regenerator. This surplus of heat would be about 300 B.t.u./hr. per pound mol of carbon burned. This would bring about a rise in the regenerator temperature to about 1720° F. The addition of more water would be required to return the unit to heat balance at about 1600° F. regenerator temperature. Material balances and heat balances for this case are shown in Tables V and VI. In the preferred embodiment of this invention changes in feed composition and other variables tending to bring about changes in regenerator would be compensated for automatically by a temperature sensing device and a means for increasing or decreasing the flow of steam into the regenerator air supply. The change in air flow which should accompany changes in water flow rate would be made manually in order to maintain the desired level of carbon on the catalyst.

Table I
EXAMPLE MATERIAL BALANCE, MOL/HR. NO WATER

|  | Feed Gas In | Prod. Gas Out | Air In | Water In | Flue Gas Out |
|---|---|---|---|---|---|
| $H_2O$ |  |  |  |  |  |
| $H_2$ |  | 1.670 |  |  |  |
| $O_2$ |  |  | 0.525 |  |  |
| $N_2$ |  |  | 1.975 |  | 1.975 |
| CO |  |  |  |  | 0.950 |
| $CO_2$ |  |  |  |  | 0.050 |
| $CH_4$ | 0.655 | 0.147 |  |  |  |
| $C_3H_8$ | 0.164 |  |  |  |  |
| lb./hr. | 17.7 | 5.7 | 71.1 |  | 83.1 |

Table II
EXAMPLE HEAT BALANCE, NO WATER

|  | lb./hr. | °F. | B.t.u./lb. | B.t.u./hr. In | B.t.u./hr. Out |
|---|---|---|---|---|---|
| Rx: |  |  |  |  |  |
| Feed Gas In | 17.7 | 1,000 | 650 | 11,500 |  |
| Product Gas Out | 5.7 | 1,450 | 2,750 |  | 15,700 |
| Heat of Reaction |  |  |  |  | 25,100 |
| Regen.: |  |  |  |  |  |
| Air In | 71.1 | 1,000 | 235 | 16,700 |  |
| Flue Gas Out | 83.1 | 1,600 | 385 |  | 32,000 |
| Heat of Combustion |  |  |  | 53,600 |  |
|  |  |  |  | 82,200 | 72,800 |
| Net Surplus Heat |  |  |  |  | 9,400 |

Table III
EXAMPLE MATERIAL BALANCE, MOL/HR., WITH WATER

|  | Feed Gas In | Prod. Gas Out | Air In | Water In | Flue Gas Out |
|---|---|---|---|---|---|
| $H_2O$ |  |  |  | 0.100 | 0.002 |
| $H^2$ |  | 1.670 |  |  | 0.098 |
| $O_2$ |  |  | 0.475 |  |  |
| $N_2$ |  |  | 1.785 |  | 1.785 |
| CO |  |  |  |  | 0.950 |
| $CO_2$ |  |  |  |  | 0.050 |
| $CH_4$ | 0.655 | 0.147 |  |  |  |
| $C_3H_8$ | 0.164 |  |  |  |  |
|  | 0.819 | 1.817 | 2.260 | 0.100 |  |
| lb./hr. | 17.7 | 5.7 | 65.2 | 1.8 | 79.0 |

Table IV
EXAMPLE HEAT BALANCE, WITH WATER

|  | lb./hr. | °F. | B.t.u./lb. | B.t.u./hr. | B.t.u./hr. |
|---|---|---|---|---|---|
| Feed Gas In | 17.7 | 1,000 | 650 | 11,500 |  |
| Product Gas Out | 5.7 | 1,450 | 2,750 |  | 15,700 |
| Heat of Reaction |  |  |  |  | 25,100 |
| Air In | 65.2 | 1,000 | 235 | 15,300 |  |
| Water In | 1.8 | 1,000 | 500 | 900 |  |
| Fine Gas Out | 79.0 | 1,600 | 390 |  | 30,800 |
| Heat of Combustion |  |  |  | 43,900 |  |
|  |  |  |  | 71,600 | 71,600 |

Table V
EXAMPLE MATERIAL BALANCE. MOL/HR., WITH 25% $C_3H_8$

|  | Feed Gas In | Prod. Gas Out | Air In | Water In | Flue Gas Out |
|---|---|---|---|---|---|
| $H_2O$ |  |  |  | 0.135 | .002 |
| $H_2$ |  | 1.590 |  |  | .133 |
| $O_2$ |  |  | 0.459 |  |  |
| $N_2$ |  |  | 1.728 |  | 1.728 |
| CO |  |  |  |  | 0.950 |
| $CO_2$ |  |  |  |  | 0.050 |
| $CH_4$ | 0.570 | 0.138 |  |  |  |
| $C_3H_8$ | 0.190 |  |  |  |  |
|  | 0.760 | 1.728 | 2.187 | 0.135 | 2.863 |
| lb./hr. | 17.4 | 5.4 | 63.1 | 2.43 | 77.5 |

Table VI
EXAMPLE HEAT BALANCE, WITH 25% $C_3H_8$

|  | lb./hr. | °F. | B.t.u./lb. | B.t.u./hr. In | B.t.u./hr. Out |
|---|---|---|---|---|---|
| Feed Gas In | 17.4 | 1,000 | 650 | 11,300 |  |
| Product Gas Out | 5.4 | 1,450 | 2,750 |  | 14,900 |
| Heat of Reaction |  |  |  |  | 23,700 |
| Air In | 63.1 | 1,000 | 235 | 14,800 |  |
| Water In | 2.43 | 1,000 | 500 | 1,200 |  |
| Fine Gas Out | 77.5 | 1,600 | 390 |  | 30,200 |
| Heat of Combustion |  |  |  | 40,500 |  |
|  |  |  |  | 67,800 | 67,800 |

I claim as my invention:

1. In a process for cracking hydrocarbons in the presence of a moving bed of hot catalytic particles which are circulated through a reaction zone to a separate heating and regeneration zone and back to the reaction zone, an improved method of controlling the temperatures resulting from the oxidation of the carbon content of the carbonized catalytic particles in said heating and regeneration zone which comprises contacting the carbonized catalytic particles in said heating and regeneration zone at a temperature of from about 1400° F. to about 1800° F. with a gaseous stream comprising a mixture of steam and an oxygen-containing gas, endothermically reacting the steam with carbon on the catalyst particles to withdraw heat from the heating and regenerating zone, and varying the ratio of steam to oxygen-containing gas in said gaseous stream in direct relation to temperature deviations from a pre-selected heating and regeneration zone temperature.

2. In a process for cracking hydrocarbons in the presence of a moving bed of hot catalytic particles which are circulated through a reaction zone to a separate heating and regenerattion zone and back to the reaction zone, an improved method of controlling the temperatures resulting from the oxidation of the carbon content of the carbonized catalytic particles in said heating and regeneration zone which comprises contacting the carbonized catalytic particles in said heating and regeneration zone at a temperature of from about 1400° F. to about 1800° F. with a gaseous stream comprising a mixture of steam and an oxygen-containing gas, endothermically reacting the steam with carbon on the catalyst particles to withdraw heat from the heating and regenerating zone, and varying the ratio of steam to oxygen-containing gas in said gaseous stream in direct relation to temperature deviations from a pre-selected reaction zone temperature.

3. In a process for the production of hydrogen by the cracking of a normally gaseous hydrocarbon in the presence of a moving bed of hot catalytic particles which are circulated through a reaction zone at a controlled temperature in the range of from about 1300° F. to about 1700° F. to a separate heating and regeneration zone and then back to the reaction zone, an improved method of controlling the temperature resulting from the oxidation of the carbon content of the carbonized catalytic particles in said heating and regeneration zone which comprises contacting the carbonized catalytic particles in said heating and regeneration zone at a temperature of from about 1400° F. to about 1800° F. with a gaseous stream comprising a mixture of steam and air, endothermically reacting the steam with carbon on the catalyst particles to withdraw heat from the heating and regenerating zone, and varying the ratio of steam to air in said gaseous mixture so that it varies with direct relation to temperature deviations from the desired controlled temperature in the heating and regeneration zone.

4. In a process for cracking hydrocarbons in the presence of a moving bed of hot catalytic particles which are circulated through a reaction zone to a separate heating and regeneration zone and back to the reaction zone, an improved method of controlling the temperatures resulting from the oxidation of the carbon content of the carbonized catalytic particles in said heating and regeneration zone which comprises contacting the carbonized catalytic particles in said heating and regeneration zone with a mixture of steam and air at a temperature of from about 1400° F. to about 1800° F., endothemically reacting the steam with carbon on the catalyst particles to withdraw heat from the heating and regeneration zone, introducing the air to the last-named zone at a substantially constant rate and varying the amount of steam in said steam-air mixture in direct relation to temperature deviations from a pre-selected heating and regeneration zone temperature.

5. In a process for cracking hydrocarbons in the presence of a moving bed of hot catalytic particles which are circulated through a reaction zone to a separate heating and regeneration zone and back to the reaction zone, an improved method of controlling the temperatures resulting from the oxidation of the carbon content of the carbonized catalytic particles in said heating and regeneration zone which comprises contacting the carbonized catalytic particles in said heating and regeneration zone with a mixture of steam and air at a temperature of from about 1400° F. to about 1800° F., endothemically reacting the steam with carbon on the catalyst particles to withdraw heat from the heating and regeneration zone, introducing the air to the last-named zone at a substantially constant rate and varying the amount of steam in said steam-air mixture in direct relation to temperature deviations from a pre-selected reaction zone temperature.

References Cited in the file of this patent
UNITED STATES PATENTS

| | | |
|---|---|---|
| 2,662,050 | Moorman et al. | Dec. 8, 1953 |
| 2,689,821 | Imhoff et al. | Sept. 21, 1954 |